United States Patent
Schütterle et al.

(10) Patent No.: US 9,476,505 B2
(45) Date of Patent: *Oct. 25, 2016

(54) SYSTEM FOR THE CONTACTLESS SEALING OF A ROTATABLY MOUNTED SHAFT WITH RESPECT TO A HOUSING, AND GEAR UNIT

(71) Applicant: SEW-EURODRIVE GMBH & CO. KG, Bruchsal (DE)

(72) Inventors: Ingo Schütterle, Sigmaringen (DE); Andreas Hess, Bietigheim (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/828,908

(22) Filed: Aug. 18, 2015

(65) Prior Publication Data

US 2015/0354708 A1    Dec. 10, 2015

Related U.S. Application Data

(63) Continuation of application No. 13/255,067, filed as application No. PCT/EP2010/001242 on Mar. 1, 2010, now Pat. No. 9,140,364.

(30) Foreign Application Priority Data

Mar. 3, 2009 (DE) .......................... 10 2009 011 124

(51) Int. Cl.
*F01D 11/02* (2006.01)
*F16J 15/16* (2006.01)
(Continued)

(52) U.S. Cl.
CPC ............. *F16J 15/164* (2013.01); *F16H 57/04* (2013.01); *F16J 15/4472* (2013.01); *Y10T 74/19991* (2015.01)

(58) Field of Classification Search
CPC ........ F16J 15/441; F16J 15/442; F16J 15/40; F16J 15/42; F16J 15/164; F16J 15/4472; F01D 11/005; F01D 11/02; F16H 57/04; Y10T 74/19991

USPC .......................................................... 277/411
See application file for complete search history.

(56) References Cited

U.S. PATENT DOCUMENTS 2,598,381 A    5/1952 Hoffman
3,806,135 A *  4/1974 Wiese .................. F04D 29/128
                                                 277/408

(Continued)

FOREIGN PATENT DOCUMENTS

DE    470 121    1/1929
DE    479 388    7/1929

(Continued)

OTHER PUBLICATIONS

International Preliminary Report on Patentability, dated Sep. 15, 2011, issued in corresponding International Application No. PCT/EP2010/001242.

(Continued)

*Primary Examiner* — Kristina Fulton
*Assistant Examiner* — Nathan Cumar
(74) *Attorney, Agent, or Firm* — Andrews Kurth Kenyon LLP

(57) ABSTRACT

A system for the contactless sealing of a rotatably mounted shaft with respect to a housing, and a gear unit, oil being provided in the interior of the housing, in particular, the rotating shaft protruding from the interior into the outer area; a centrifugal disk, joined in rotatably fixed manner to the shaft, having at least partially radially extending bores that connect oil from a centrifugal chamber to a collection chamber surrounding the centrifugal disk.

14 Claims, 2 Drawing Sheets

(51) Int. Cl.
*F16H 57/04* (2010.01)
*F16J 15/447* (2006.01)

(56) References Cited

U.S. PATENT DOCUMENTS

| | | | |
|---|---|---|---|
| 3,971,565 | A | 7/1976 | Schickling et al. |
| 4,157,834 | A | 6/1979 | Burdette |
| 4,410,187 | A | 10/1983 | Legoy et al. |
| 5,035,155 | A * | 7/1991 | Robledo ............... F01M 11/00 184/106 |
| 5,228,700 | A | 7/1993 | Biesold et al. |
| 5,498,006 | A | 3/1996 | Orlowski |
| 5,538,258 | A | 7/1996 | Hager et al. |
| 5,636,848 | A | 6/1997 | Hager et al. |
| 5,833,372 | A | 11/1998 | Nisley |
| 5,996,542 | A | 12/1999 | Bathurst |
| 6,155,574 | A | 12/2000 | Borgstrom et al. |
| 6,170,832 | B1 | 1/2001 | Ernst |
| 6,629,816 | B2 * | 10/2003 | Langston ............... F16J 15/164 277/352 |
| 6,843,482 | B1 | 1/2005 | Bayne |
| 7,055,827 | B2 | 6/2006 | Langston et al. |
| 2003/0035718 | A1 | 2/2003 | Langston et al. |
| 2007/0007731 | A1 * | 1/2007 | Zahn ............... F16J 15/3252 277/551 |
| 2007/0164516 | A1 | 7/2007 | Olsen et al. |
| 2010/0102514 | A1 | 4/2010 | Lipot |

FOREIGN PATENT DOCUMENTS

| | | |
|---|---|---|
| DE | 33 30 473 | 5/1984 |
| DE | 35 44 783 | 6/1987 |
| DE | 39 30 280 | 3/1991 |
| DE | 42 20 754 | 1/1994 |
| DE | 1 260 724 | 11/2002 |
| DE | 698 18 914 | 8/2004 |
| DE | 11 2004 000 627 | 3/2006 |
| DE | 10 2005 059 847 | 2/2007 |
| DE | 603 06 634 | 6/2007 |
| DE | 602 16 474 | 9/2007 |
| DE | 601 30 871 | 7/2008 |
| DE | 10 2007 014 657 | 10/2008 |
| EP | 1 260 724 | 11/2002 |
| EP | 1 496 294 | 1/2005 |
| GB | 2 236 813 | 4/1991 |
| WO | WO 99/49246 | 9/1999 |
| WO | 2010/099914 | 9/2010 |

OTHER PUBLICATIONS

International Search Report, dated Jul. 1, 2010, issued in corresponding International Application No. PCT/EP2010/001242.

Written Opinion, dated Jul. 1, 2010, issued in corresponding International Application No. PCT/EP2010/001242.

International Preliminary Report on Patentability and Written Opinion, dated Oct. 4, 2012, issued in corresponding International Application No. PCT/EP2011/000379.

International Search Report, dated May 20, 2011, issued in corresponding International Application No. PCT/EP2011/000379.

* cited by examiner

SYSTEM FOR THE CONTACTLESS SEALING OF A ROTATABLY MOUNTED SHAFT WITH RESPECT TO A HOUSING, AND GEAR UNIT

CROSS-REFERENCE TO RELATED APPLICATION

The present application is a continuation of U.S. patent application Ser. No. 13/255,067, filed on Sep. 6, 2011, which is a national phase of PCT International Application No. PCT/EP2010/001242, filed on Mar. 1, 2010, which claims priority to German Patent Application No. 10 2009 011 124.7, filed on Mar. 3, 2009, each of which is expressly incorporated herein in its entirety by reference thereto.

FIELD OF THE INVENTION

The present invention relates to a system for the contactless sealing of a rotatably mounted shaft with respect to a housing, and a gear unit.

BACKGROUND INFORMATION

In sealing systems having shaft sealing rings, it is well-known that friction losses increase as the rotational speed increases.

German Published Patent Application No. 602 16 474 describes a contactless sealing in which a centrifugal disk, having radial bores as slinger ports (FIG. 1 there, reference 44), is provided on a shaft. The radial bores permit lubricating oil, which was accumulated in a radially inner centrifuging chamber, to flow out, the bores then centrifuging the oil off at their other end area into a collection chamber. The centrifugal disk has an axial gap with respect to a non-rotating part, the gap joining the centrifuging chamber to the collection chamber.

A labyrinth seal is described in German Published Patent Application No. 479 388.

U.S. Pat. No. 2,598,381 describes connecting an interior space of a gear unit, partially filled with lubricating oil, via an air channel (FIG. 1 there, reference numeral 9) to the outside air, for example, for compressed-air compensation. In that case, oil is conveyed radially and axially inward by centrifugal force, by providing a suitable bevel. Independently of this air channel, a contactless sealing is achieved by a centrifugal edge which, during rotational movement, centrifuges the oil off into a collection chamber (FIG. 1 there, reference numeral 13) that is connected by a downward running bore to the oil-pan space.

German Published Patent Application No. 10 2007 014 657 describes a shaft sealing device in which oil, likewise centrifuged off, is recirculated.

German Published Patent Application No. 698 18 914 describes a shaft sealing system in which a shaft sealing ring is provided.

A sealing ring for a water-pump bearing is described in German Published Patent Application No. 601 30 871.

German Published Patent Application No. 42 20 754 also describes a sealing system that functions in non-contact fashion during rotational movement of the shaft of a gear unit, in which oil, likewise centrifuged off, is recirculated.

German Published Patent Application No. 39 30 280 likewise describes such a sealing system functioning in non-contact fashion during rotational movement of the shaft.

A sealing system acting in contacting fashion is described in German Published Patent Application No. 35 44 783.

A sealing system that functions in non-contact fashion during rotational movement of the shaft, in which oil, likewise centrifuged off, is recycled is also described in German Published Patent Application No. 33 30 473.

German Published Patent Application No. 11 2004 000 627 also describes a sealing system that functions in non-contact fashion during rotational movement of the shaft, and in which oil spun off by a plurality of shaft grooves is likewise recycled.

A sealing system that functions in non-contact fashion during rotational movement of the shaft and in which oil spun off by pointed edges is likewise recirculated is described in German Published Patent Application No. 470 121, as well.

U.S. Pat. No. 5,538,258 describes a contactless sealing in which a centrifugal disk, having radial bores as slinger ports (FIG. 1 there, reference numeral 44), is provided on a shaft. The radial bores permit lubricating oil, which was accumulated in a radially inner centrifugal chamber, to flow out, the bores then ejecting the oil at their other end area into a collection chamber. The centrifugal disk has an axial gap with respect to a non-rotating part, the gap joining the centrifugal chamber to the collection chamber.

SUMMARY

Example embodiments of the present invention reduce maintenance costs and losses in the case of a sealing system.

Among features of example embodiments of the present invention with regard to the system are that it is provided for the contactless sealing of a rotatably mounted shaft with respect to a housing, oil being provided in the interior of the housing, in particular, the rotating shaft protruding from the interior into the outer area, wherein a centrifugal disk, joined in rotatably fixed manner to the shaft, has at least partially radially extending bores that connect oil from a centrifugal chamber to a collection chamber surrounding the centrifugal disk.

In particular, a centrifugal disk, joined in rotatably fixed manner to the shaft, thus has bores extending at least partially in the radial direction, so that lubricating oil is able to be conveyed from a centrifugal chamber to a collection chamber surrounding the centrifugal disk, the bores opening through with their radially inner end area into the centrifugal chamber, and opening through with their radially outer end area into the collection chamber, between the centrifugal disk and a flange part of the housing, a gap region being provided which connects the centrifugal chamber to the collection chamber and into which a bore leads with its first end area, the bore opening through with its other end area into a further collection-chamber area, so that lubricating oil, centrifuged off into the further collection-chamber area by a centrifugal edge joined in rotatably fixed fashion to the shaft, is able to be collected and fed through the bore to the gap region, a gap region connecting the further collection-chamber area to the centrifugal chamber.

The bore between the gap region and the further collection-chamber area preferably extends axially.

Of advantage is that the oil is able to be conveyed out of a centrifugal chamber—which at least partially surrounds the centrifugal disk and is bounded by housing parts and the shaft or centrifugal sleeve provided on the shaft—through the centrifugal disk, namely, through bores in the centrifugal disk. Thus, effective emptying of the centrifugal chamber is attainable. In so doing, the oil is emptied out not into the oil-pan area or the interior space, e.g., into the interior of the gear unit, but rather into a collection chamber, therefore, a spatial area which is bounded by the flange parts and the rotating part, thus, the shaft or a centrifugal sleeve provided on the shaft.

In this manner, it is possible to avoid wear to the seal, particularly in comparison to shaft sealing rings which are subject to wear. Furthermore, maintenance costs are improved and reliability is likewise improved.

It is further advantageous that oil, which is caught in a collection chamber situated axially further outside, is able to be fed into the gap region between the co-rotatable centrifugal disk and the stationary flange part. Since this gap region extends radially, a pressure gradient exists between the centrifugal chamber and the collection chamber that has a conveying effect which acts as return. Thus, even if oil on the centrifugal disk were to arrive further axially to the outside, a return from a downstream collection chamber would be made possible through the bore between the gap region and the collection-chamber area.

An advantage is that an active pumping action is attainable, accompanied by a contactless sealing.

In example embodiments, the centrifugal disk is secured on a centrifugal sleeve which is provided on the shaft. This is advantageous because assembly is easy, and in addition, diameter variations, such as an axial area with increasing or decreasing diameter, may be produced in an inexpensive and uncomplicated manner. The reason is the centrifugal sleeve does not pass any substantial torque through, the centrifugal disk being secured on the centrifugal sleeve, however. Thus, centrifugal grooves are able to be provided easily and inexpensively in the centrifugal sleeve, as well.

In example embodiments, the centrifugal chamber is bounded at least partially by a channel running round on the centrifugal disk, the channel being formed as the local maximum of the radial distance of the surface of the centrifugal disk; thus, in particular, the radial distance of adjacent surface areas of the centrifugal disk increases with decreasing axial distance toward the channel. This offers the advantage that oil propelled by the centrifugal force is driven into this channel, and from there, is then conveyed away with the aid of the bores.

In example embodiments, at least in one axial partial area, the outside diameter of the centrifugal sleeve increases toward the centrifugal disk, particularly with the aid of a chamfer provided on the centrifugal sleeve, especially so that oil is conveyed in the direction of the centrifugal disk, especially in the direction of the channel of the centrifugal disk. The advantage in this context is that a conveying action is able to take place in the direction of the channel, and therefore the oil is able to be discharged, especially in an easy manner, via the associated bore in the centrifugal disk, into the collection chamber.

In example embodiments, provided between the centrifugal disk and a flange part of the housing is a gap region, especially a radially extended gap region, into which a bore leads that is connected to a collection groove, thus a collection-chamber area, provided in the flange part, in particular, the bore being situated at smaller radial distance than the radial distance of the end area of the gap region, which opens through into the collection chamber, in particular, the collection groove being provided axially further outside than the centrifugal disk. The advantage in this case is that a pumping action is attainable in the gap region, since the gap region is bounded at a first lateral surface by the centrifugal disk, and at the lateral surface opposite this first lateral surface, by the housing part that does not co-rotate, thus, especially the outer flange part. Therefore, an underpressure is obtained for emptying the bore leading in, in the direction of the collection chamber connected at greater radial distance.

In example embodiments, a gap is provided between the centrifugal sleeve and a further flange part joined to the flange part, the gap being implemented as a radial gap in a first partial area, and as an axial gap in a further partial area. This is advantageous in that oil must traverse the radial gap coming from outside to the inside, since the end area of the radial gap with greater radial distance is disposed toward the interior, and the end area of the radial gap with smaller radial distance must first be reached against the centrifugal force.

In example embodiments, the gap opens through into a collection groove that is provided in the further flange part and is connected to the collection chamber via a further gap which is situated between the further flange part and the centrifugal sleeve. The advantage here is that the gap represents a further barrier for penetrating oil. In particular, it may be implemented as a capillary gap, and therefore also represents a barrier very difficult to overcome.

In example embodiments, the collection chamber is connected in its lower area via a bore to the interior of the housing, especially to the oil-pan area. This is advantageous because oil which has penetrated or been caught in the collection chamber is able to be evacuated to the oil pan, especially driven by the force of gravity.

In example embodiments, the flange parts are screw-connected and a seal, especially an O-ring seal, is disposed between them. The advantage here is that the housing may be made strong and leak-proof. In particular, the joint of the two flange parts is sealed up, so that the O-ring seal lies further inside in the joining surface and the screw connection lies further outside. Therefore, no oil penetrates from the interior space via the joining surface, thus the contact surface, to the thread area of the screw, and from there into the outer area. FIG. 1 shows a screw passing through from the outer area through the outer and the inner flange part. In a further improved exemplary embodiment, the screw does indeed penetrate through the outer flange part, but is screwed into a non-through bore in the inner flange part.

In example embodiments, a first baffle area having a first drainage channel is disposed on the further flange part, in particular, a second baffle area having a second drainage channel being disposed on the further flange part, the baffle area and drainage channel in particular being axially symmetric. This offers the advantage that each baffle area is able to be provided combined with a corresponding drainage channel, so that the liquid portions which have struck are able to be carried away quickly and easily. Therefore, the main quantity of the oil sprayed around during operation above the oil level is able to be collected and recirculated, particularly at the periphery of the overall sealing system.

In example embodiments, in each case a centrifugal groove is disposed on the centrifugal sleeve, radially opposite the collection groove(s). This is advantageous, because the centrifugal groove may be produced easily and inexpensively.

In example embodiments, the gap regions are each implemented as capillary gap regions. The advantage here is that the resistance to flow for oil is very high, and this is therefore hindered in respect to the at least rapid flow through the gap.

In example embodiments, a dust protector, which is in contact with the flange part, is disposed on the shaft. The advantage in this case is that the functioning method of the sealing system is not disturbed, for in the event great quantities of dust penetrate, a bore could be stopped up, for example. The spatial area protected by the dust protector is connectable directly or with the aid of a gap to a collection groove or to some other collection area such as the collection chamber, for instance.

The dust protector does not contribute to the actual sealing action of the sealing system, for it protects only against penetrating dust and contacts the flange part, belonging to the housing, at its outer surface.

In example embodiments, the oil level lies below—thus below in the gravitational direction—the system when the gear unit is at rest. The advantage in this context is that in the state of rest, there is no possibility that oil will pass through the sealing system, and then penetrate into the outer area.

LIST OF REFERENCE NUMERALS

1 Shaft
2 Axial gap, capillary cap region
3 Entry labyrinth, including radially extended gap section, capillary cap region
4 Drainage channel
5 Calming space
6 Baffle surface
7 Collection groove
8 Drainage channel
9 Baffle surface
10 Collection chamber
11 Centrifugal bore
12 Gap, particularly radial gap, capillary cap region
13 Collection groove, further collection-chamber area
14 Third centrifugal groove
15 Second centrifugal groove
16 First centrifugal groove
17 Dust protector
18 Inner return bore
19 Flange, outer sealing flange
20 Retaining screw
21 Outer return bore
22 Centrifugal disk
23 Inner sealing flange, further flange apart
24 Drain bore
25 Centrifugal sleeve
26 O-ring seal
27 Centrifugal chamber
28 Chamfer
29 Widening Example embodiments of the present invention are explained in greater detail with reference to the Figures.

DETAILED DESCRIPTION

Figure 1:
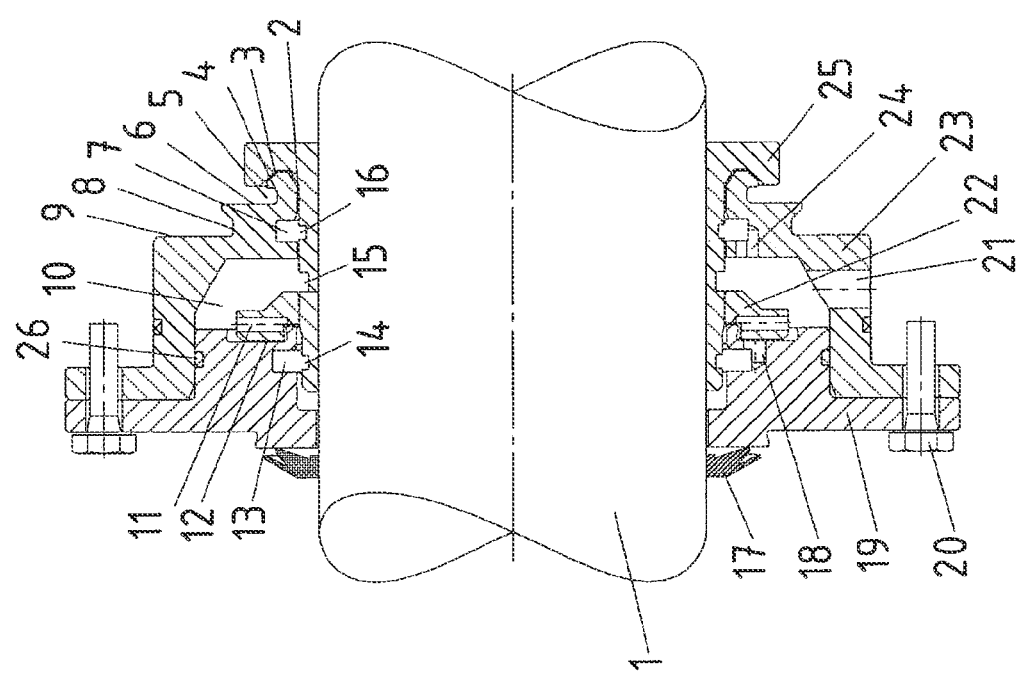
FIG. 1 illustrates a system according to an example embodiment of the present invention.
Figure 2:
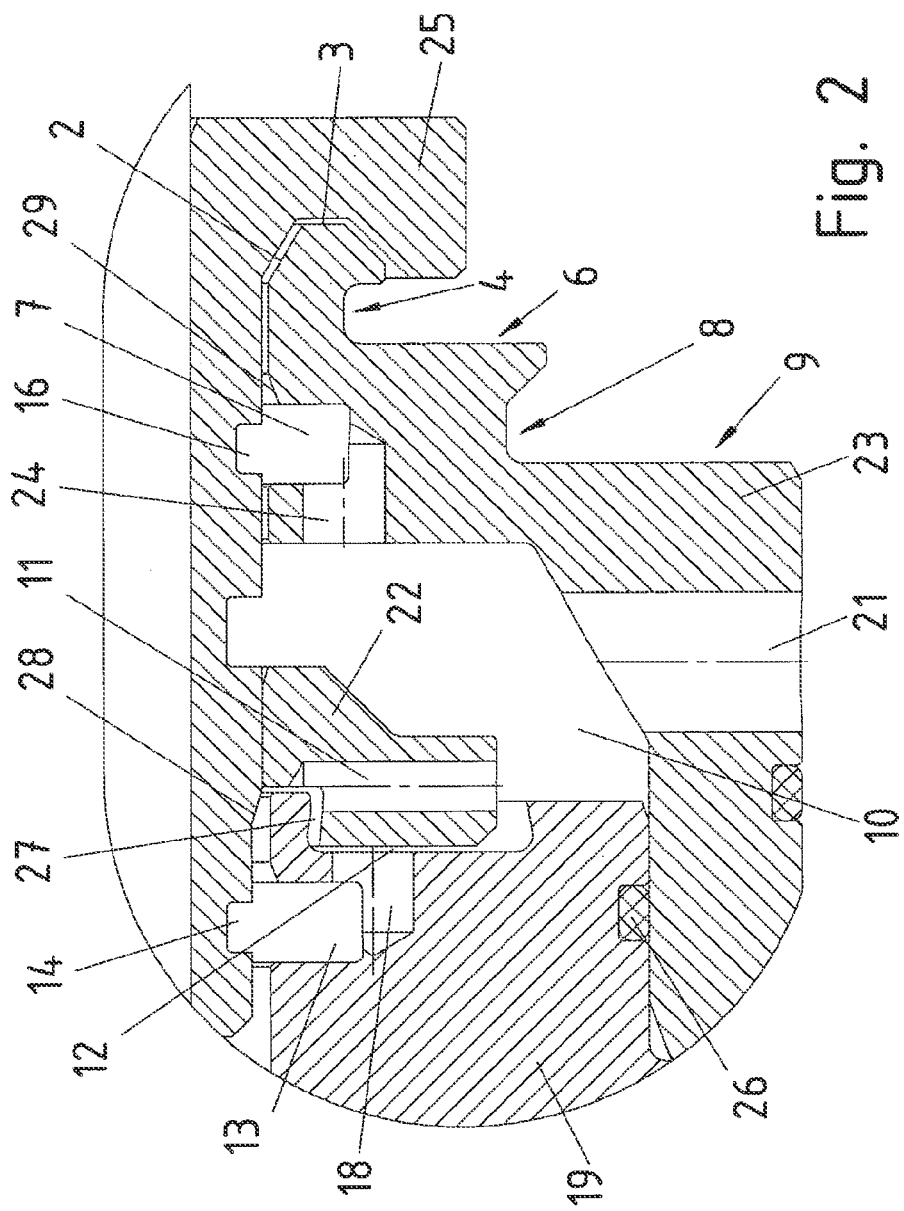
FIG. 2 is an enlarged cross-sectional view of the system illustrated in FIG. 1.

A system according to an example embodiment of the present invention is shown schematically in FIG. 1. An enlarged section is shown in FIG. 2.

According to example embodiments of the present invention, a contactless sealing is attained between a rotating shaft 1 and a housing.

In this context, disposed on shaft 1 is a centrifugal sleeve 25 on which, in addition, a centrifugal disk 22 is situated, in particular, joined with material locking or as a press-fitted connection.

An outer sealing flange 19 and an inner sealing flange 23 are provided on the housing, the centrifugal disk being set apart from outer sealing flange 19 by a gap 12, and centrifugal sleeve 25 being set apart from inner sealing flange 23 by a gap, including entry labyrinth 3 and axial gap 2.

The sealing system is set up in multiple stages, and in this manner, the oil passing through each obstacle is in each instance met with a further obstacle.

The entire sealing system is disposed above the oil level which sets in when shaft 1 is at rest. During operation of shaft 1, oil foam or spraying oil may be produced, for example, by gear wheels connected directly or indirectly with the shaft. Preferably, this oil level is below return bore 21.

The oil striking against baffle surface 9 is drained off via an annularly formed drainage channel 8, and downward toward the oil pan.

Provided axially somewhat further inside, but radially deeper, is baffle surface 6, which is bounded radially to the inside by an annular calming space 5 that has a drainage channel 4 situated radially inside. Entry labyrinth 3, which is provided between centrifugal sleeve 25 and inner sealing flange 23, begins directed inwards in the axial direction, then goes over into a radially running section and ends as axial gap 2 situated radially further inside, which then runs directed outwards in the axial direction, and at its end area, widens in the direction of collection groove 7. The flaring, thus the widening denoted by reference numeral 29, is realized by a suitable chamfer, so that the capillary effect is interrupted in this area. A centrifugal groove 16 is disposed on centrifugal sleeve 25, opposite collection groove 7, and is provided to spin oil off in the direction of collection groove 7. At the lower area of collection groove 7, a drain bore is provided that is aligned in the axial direction and leads into a collection chamber 10, which in turn returns oil via a bore, namely, outer return bore 21 in inner sealing flange 23, back into the oil pan.

Between centrifugal sleeve 25 and inner sealing flange 23, a gap is provided that connects collection groove 7 to collection chamber 10.

A centrifugal groove 15 is again disposed in the axial region of collection chamber 10, so that oil which penetrates via the indicated gap is centrifuged off.

In addition, provided axially following is centrifugal disk 22 that likewise centrifuges oil off into collection chamber 10.

Axially following centrifugal disk 22, a further centrifugal groove 14 is again provided, opposite which a collection groove 13 is located on flange part 19. Thus, oil is spun off from the edges of centrifugal groove 14 into collection groove 13.

Centrifugal sleeve 25 is implemented with a chamfer 28 such that its outside diameter increases in an axial area which is located between centrifugal groove 14 and centrifugal disk 22, and specifically, increases with decreasing distance to centrifugal disk 22, so that oil possibly appearing is conveyed in this direction, thus, toward centrifugal disk 22. Therefore, chamfer 28 contributes in connection with the return flow. The oil is then conveyed into centrifugal chamber 27, which is emptied into collection chamber 10 with the aid of centrifugal bores 11 that are introduced into centrifugal disk 22 in the radial direction. A plurality of such centrifugal bores 11, especially between four and twenty, are provided at the periphery of the centrifugal disk.

Collection groove 13, situated axially further to the outside, has at its lower region, especially including the deepest point, a bore 18 directed axially toward the gap region, thus, gap 12, which is provided between centrifugal disk 22 and outer flange 19. Collection groove 13 is assigned a centrifugal groove 14, which is provided on centrifugal sleeve 25.

This gap region of gap 12 is open toward collection chamber 10. Since bore 18 discharges into gap region 12 at a radial distance that is smaller than the radial distance of radially outside end area of gap region 12, where gap region 12 discharges into collection chamber 10, a conveying effect is provided. The reason is that due to the rotational movement, an underpressure is generated, which causes bore 18, and therefore collection groove 13, to be pumped out.

Thus, not only is the well-known centrifuging provided for the discharge, but also the pumping effect of a gap region 12.

Collection grooves 7 and 13 are therefore emptied into collection chamber 10, and not directly into the interior and/or the oil-pan area. To that end, bore 24 connects collection groove 7 to collection chamber 10.

Inner sealing flange 23 and outer sealing flange 19 are joined to each other, sealed off by an O-ring seal 26, a plurality of successive retaining screws 20 in the circumferential direction joining the two sealing flanges. Thus, a one-piece construction of the two sealing flanges 19 and 23 is also possible. A dust protector 17 is just provided externally.

A further collection-chamber area is formed by collection groove 13, that is situated separate from collection chamber 10 and is provided further axially outwards.

What is claimed is:

1. A system for contactless sealing of a rotatably mounted shaft with respect to a housing, an interior of the housing being filled at least partially with lubricating oil, comprising:
    a centrifugal disk, joined in rotatably fixed manner to the shaft, having bores for conveying the lubricating oil from a centrifugal chamber to a collection chamber, the bores opening through into the centrifugal chamber, and opening through into the collection chamber; and
    a gap region arranged between the centrifugal disk and a flange part of the housing, the gap region connecting the centrifugal chamber to the collection chamber, a bore on the housing and leading into the gap region, that with its other end area opens through into a further collection-chamber area, so that lubricating oil centrifuged off into the further collection-chamber area by a centrifugal edge is collectable and feedable through the bore to the gap region.

2. The system according to claim 1, wherein the centrifugal disk is secured on a centrifugal sleeve that is provided on the shaft and includes centrifugal grooves.

3. The system according to claim 2, wherein at least in one axial partial area, an outside diameter of the centrifugal sleeve increases toward the centrifugal disk with the aid of a chamfer provided on the centrifugal sleeve, so that oil is conveyable in at least one of (a) a direction of the centrifugal disk and (b) a direction of a channel of the centrifugal disk.

4. The system according to claim 1, wherein the gap region connects the further collection-chamber area to the centrifugal chamber, and wherein the gap region is arranged as at least one of (a) a radial gap and (b) a radially extended gap region, the further collection-chamber area being formed by a collection groove provided in the flange part, the bore being situated at a smaller radial distance to a shaft axis than a radial distance of an end area of the gap region which opens through into the further collection-chamber area, the collection groove being provided axially further outside than the centrifugal disk.

5. The system according to claim 2, wherein a gap is provided between the centrifugal sleeve and a further flange part joined to the flange part, the gap extending radially in a first partial area and axially in a further partial area.

6. The system according to claim 5, wherein the gap opens through into at least one collection groove provided in the further flange part and is connected to the collection chamber via a further gap disposed between the further flange part and the centrifugal sleeve.

7. The system according to claim 1, wherein the collection chamber is connected in a lower area via a bore to (a) the interior of the housing or (b) an oil-pan area.

8. The system according to claim 5, wherein the flange part and the further flange part are screw-connected, and a seal is disposed between the flange part and the further flange part.

9. The system according to claim 5, wherein a first baffle area, having a first drainage channel, is situated on the further flange part, a second baffle area having a second drainage channel being disposed on the further flange part, the baffle areas and the drainage channels being axially symmetric.

10. The system according to claim 6, wherein each collection groove is assigned a particular intended centrifugal groove located radially opposite on the centrifugal sleeve.

11. The system according to claim 1, wherein the gap region is a capillary gap region.

12. The system according to claim 1, further comprising a dust protector in contact with the flange part disposed on the shaft.

13. The system according to claim 1, wherein the gap region is arranged as a capillary gap, and wherein at one axial end area of the gap region, a widening is provided which is arranged such that a capillary effect is interrupted in an area of the widening.

14. A gear unit, comprising:
    a system according to claim 1;
    wherein, when the gear unit is at rest, an oil level lies below in a gravitational direction the system.

* * * * *